US012686256B2

(12) United States Patent
Waim et al.

(10) Patent No.: US 12,686,256 B2
(45) Date of Patent: Jul. 21, 2026

(54) AXLE DRIVE FOR A VEHICLE

(71) Applicant: ZF Friedrichshafen AG, Friedrichshafen (DE)

(72) Inventors: Thomas Waim, Grafenau (DE); Julian Lüftl, Tiefenbach (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 18/980,210

(22) Filed: Dec. 13, 2024

(65) Prior Publication Data

US 2026/0166976 A1     Jun. 18, 2026

(30) Foreign Application Priority Data

Dec. 13, 2024     (DE) .......................... 102023212671.0

(51) Int. Cl.
*B60K 17/16*          (2006.01)
*B60K 1/00*           (2006.01)

(52) U.S. Cl.
CPC ................ B60K 1/00 (2013.01); B60K 17/16 (2013.01); *B60K 2001/001* (2013.01)

(58) Field of Classification Search
CPC ..... B60K 1/00; B60K 17/16; B60K 2001/001
See application file for complete search history.

(56) References Cited

U.S. PATENT DOCUMENTS

| | | | | |
|---|---|---|---|---|
| 8,651,994 B2 * | 2/2014 | Bassi | ..................... | B60K 23/08 |
| | | | | 180/24.09 |
| 2010/0062891 A1 * | 3/2010 | Ekonen | .............. | B60K 23/0808 |
| | | | | 74/405 |
| 2011/0319213 A1 * | 12/2011 | Ekonen | ................ | B60K 17/346 |
| | | | | 475/221 |
| 2020/0096054 A1 * | 3/2020 | Smith | ..................... | B60K 17/34 |
| 2020/0124149 A1 | 4/2020 | Palfai et al. | | |
| 2021/0394602 A1 * | 12/2021 | Schilder | ................... | F16H 3/66 |
| 2023/0046751 A1 * | 2/2023 | Boudreau | ........... | B60L 15/2036 |
| 2023/0101199 A1 * | 3/2023 | Brilka | ................. | F16H 61/0403 |
| | | | | 180/242 |
| 2023/0103790 A1 * | 4/2023 | Igl | ........................ | B60K 17/356 |
| | | | | 180/242 |
| 2023/0243408 A1 * | 8/2023 | Kölbl | ...................... | F16H 48/22 |
| | | | | 475/150 |
| 2023/0406097 A1 * | 12/2023 | Yang | ...................... | B60K 23/08 |
| 2024/0198794 A1 * | 6/2024 | Milacic | ................ | B60K 17/165 |

FOREIGN PATENT DOCUMENTS

JP          2020106048 A       7/2020

OTHER PUBLICATIONS

German Search Report for Application No. 102023212671.0 Dated Feb. 8, 2024.

* cited by examiner

*Primary Examiner* — Farhana Pervin
(74) *Attorney, Agent, or Firm* — Dority & Manning, P.A.

(57)          ABSTRACT
An axle drive for a vehicle includes at least one electric machine (1) as a drive and a transmission (2), which is coupled via an output differential (3) to output shafts (4, 5) for driving vehicle wheels. An overload decoupling device (6) is arranged between the output differential (3) and the output shafts (4, 5) with respect to a torque flow.

15 Claims, 3 Drawing Sheets

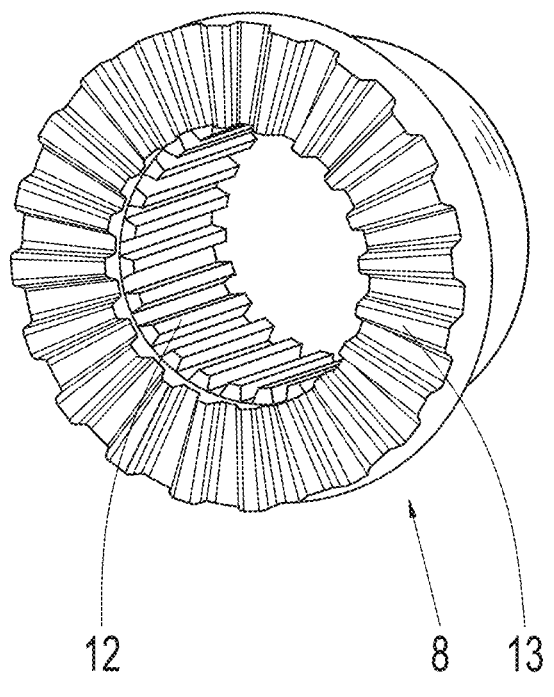
12    8    13    Fig. 4
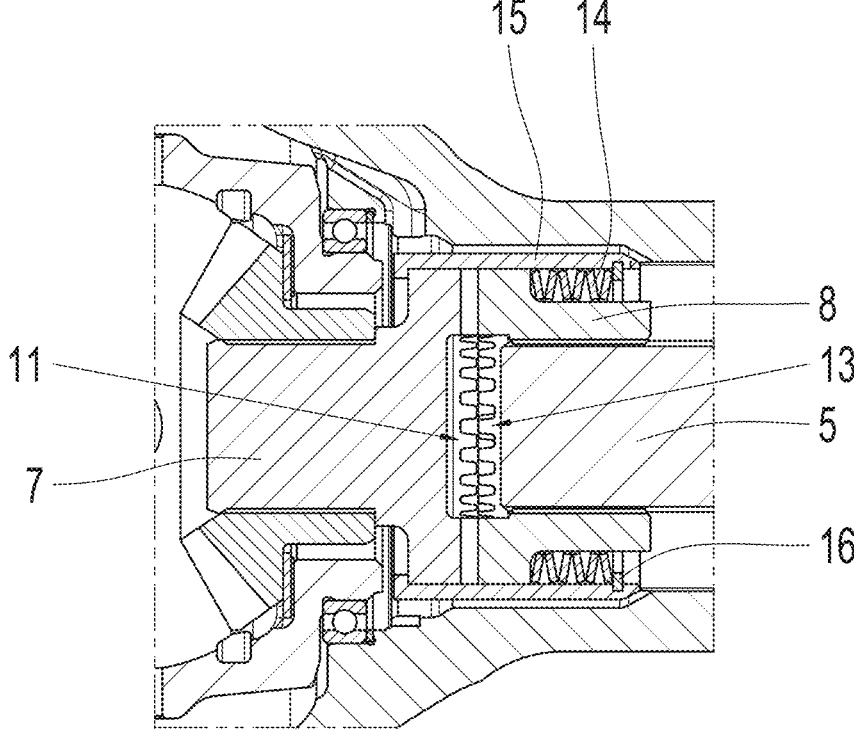
15    14
11
7
8
13
5
16
Fig. 5

AXLE DRIVE FOR A VEHICLE

CROSS-REFERENCE TO RELATED APPLICATION

The present application is related and has right of priority to German Patent Application No. DE 102023212671.0 filed on Dec. 14, 2023, which is incorporated by reference in its entirety for all purposes.

TECHNICAL FIELD

The present invention relates generally to an axle drive for a vehicle, wherein the axle drive includes at least one electric machine as a drive, and a transmission, which is coupled via an output differential to output shafts for driving vehicle wheels.

BACKGROUND

For example, document JP 2020 106 048 A describes a vehicle drive having an electric machine which is coupled via a planetary transmission as a reduction gear and via an overload decoupling device to a differential, which differential is connected to the output shafts for driving vehicle wheels. Therefore, by the overload decoupling device which is arranged in the torque path on the input end or upstream from the output differential, only an overload on the differential which occurs due to the electric machine can be prevented. It has been shown, however, that output-side loads are particularly disadvantageous, since these occur, for example, at the vehicle wheels and are transmitted onto the output shafts, such that output-side components can become damaged when the loads are transmitted.

SUMMARY

Example aspects of the present invention provide an axle drive, which cost-effectively prevents damage due to loads occurring both on the input side and on the output side.

Example aspects of the invention therefore relate to an axle drive for a vehicle having at least one electric machine as a drive and having a transmission, wherein the transmission is coupled via an output differential to output shafts for driving vehicle wheels, and wherein an overload decoupling device is provided. In order to cost-effectively prevent damage due to occurring overloads or torque peaks, according to example aspects of the invention, the overload decoupling device is arranged between the output differential and the output shafts with respect to a torque flow or a torque path.

In this way, in the axle drive according to example aspects of the invention, when an overload occurs on the input side and/or on the output side, a torque transmission between the output differential and the output shafts is interrupted by the overload decoupling device according to example aspects of the invention, such that damage is prevented, in particular at the output shafts.

It is particularly preferred with respect to the axle drive according to example aspects of the invention that the electric machine and/or the transmission are/is arranged coaxially with the output shafts. In the particularly space-saving and cost-effective coaxial arrangement, the electric machine and the transmission, which is in the form, for example, of a planetary transmission or the like, are arranged axially next to each other, such that at least one of the output shafts is guided axially through the electric machine and the transmission. In the axle drive according to example aspects of the invention, due to the overload decoupling device which is arranged between the differential and the output shafts, a more cost-effective output shaft having small dimensions can be readily used, since loads which are possibly acting on the output shaft are advantageously prevented due to the provided overload decoupling device in the axle drive according to example aspects of the invention.

It is particularly cost-effective with respect to the axle drive according to example aspects of the invention when the overload decoupling device includes a first coupling element and a second coupling element, between which an interlocking or friction-locking torque transmission, which can be decoupled according to the load, is provided. Therefore, a torque transmission can be interrupted when torque peaks occur by simply disconnecting the interlocking connection or the frictional connection between the coupling elements.

For example, the coupling elements can be interlockingly interconnected via toothings which have repellent or outwardly-directed tooth geometries and are preloaded against one another. For this purpose, the teeth, or tooth flanks, of the toothings can have, for example, different pressure angles on either side, such that axial forces act on the coupling elements when the vehicle travels forward or in reverse, which axial forces bring about, at a predetermined torque, an axial decoupling movement at the two coupling elements, such that the two coupling elements are moved out of the toothed engagement.

It is also conceivable with respect to the axle drive according to example aspects of the invention that the coupling elements are frictionally interconnected via friction surfaces, or the like, which are preloaded against one another. For example, it is conceivable that the friction surfaces are designed such that, at a predetermined torque, the frictional connection between the friction surfaces of the two coupling elements is interrupted, such that a transmission of torque is not possible when, for example, torque peaks occur.

In order to prevent the overload-induced loads at the output shafts, the first coupling element is connected, for example, to a component of the output differential and the second coupling element is connected to one of the output shafts.

In principle, it is conceivable that the output differential used in the electric axle drive according to example aspects of the invention is, for example, an epicyclic gear train, or a planetary transmission, a bevel gear differential, a spur gear differential, or a helical gear differential. Particularly advantageous, however, is the use of a particularly cost-effective bevel gear differential as the output differential.

BRIEF DESCRIPTION OF THE DRAWINGS

Example aspects of the present invention are explained in greater detail in the following with reference to the drawings, wherein:

FIG. 4 shows a single-part view of a second coupling element of the overload decoupling device; and FIG. 5 shows a sectional detailed view of the overload decoupling device in the decoupled state of the coupling elements.

DETAILED DESCRIPTION

Figure 1:
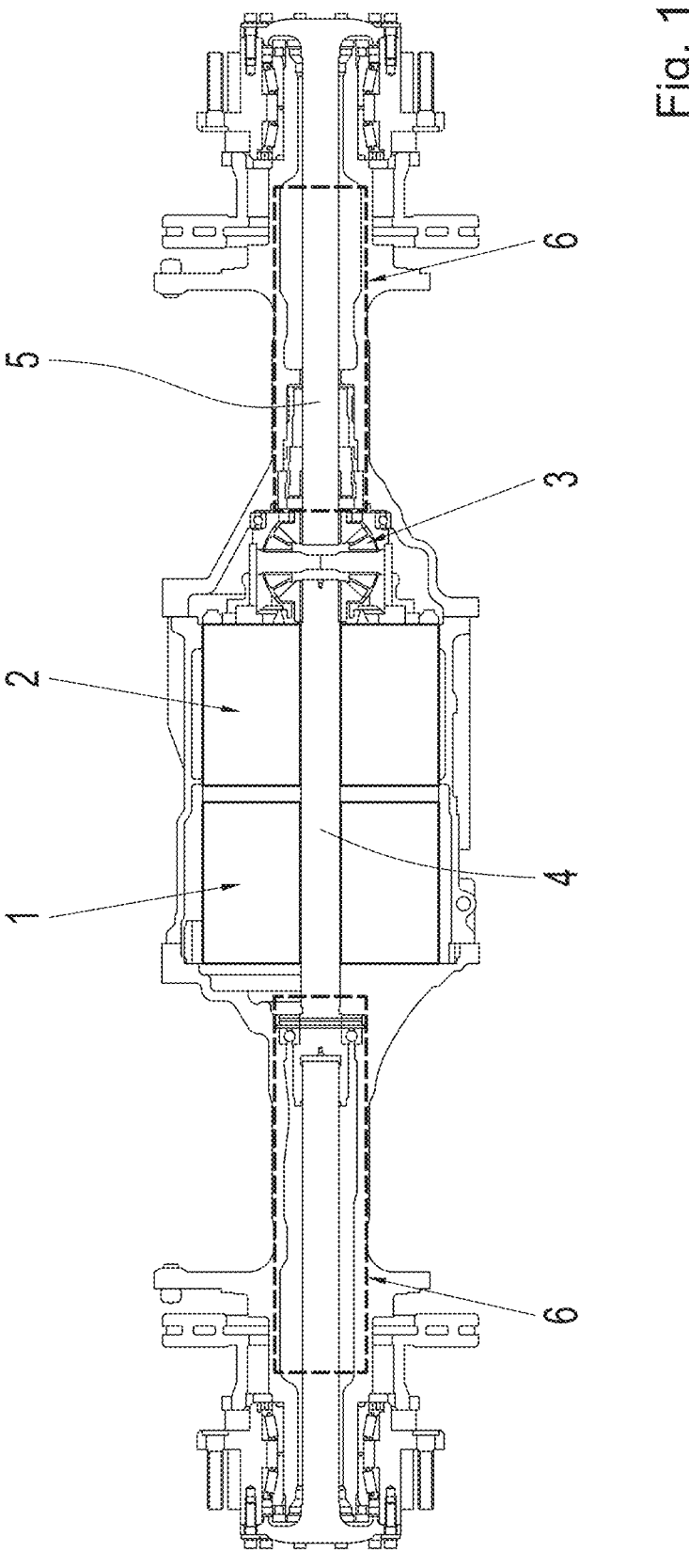
FIG. 1 shows a sectional basic view of possible embodiments of an electric axle drive according to example aspects of the invention with indicated placement positions of an overload decoupling device between an output differential and one of the output shafts.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIGS. 1 through 5 show various views of an electric axle drive of a vehicle, in particular of a utility vehicle, according to example aspects of the invention.

The axle drive according to example aspects of the invention has an electric machine 1 as a drive and a transmission 2 in a housing, the transmission 2 being coupled via an output differential 3 to output shafts 4, 5 for driving vehicle wheels (not shown in greater detail). Furthermore, an overload decoupling device, or overload coupling 6, is provided, which overload decoupling device is arranged between the output differential 3 and the output shafts 4, 5 with respect to a torque flow or a torque path.

As is apparent in FIG. 1 in particular, the electric machine 1 and the transmission 2 are arranged coaxially with the output shafts 4, 5. The electric machine 1 and the transmission 2 are arranged axially next to each other and axially next to the output differential 3, such that one output shaft 4 is guided axially through the electric machine 1 and through the transmission 2.

In particular in the field of utility vehicles, the different vehicle applications result in a wide range of requirements, such that the axle drive must be reinforced for certain applications. These applications can generate very high and damaging load peaks when there is a switch between traction and coasting. A further application is the use of a differential lock when the differential lock has accidentally not been deactivated. As a result, during cornering, high amounts of static friction occur on the vehicle wheels, as a result of which a high torque acts on the output shafts.

In FIG. 1, a dashed line indicates, by way of example, two possible placement positions of the overload decoupling device 6 between the output differential 3 and the output shafts 4, 5 in order to prevent the above-described loads on the axle drive and, in this way, to be able to use components having correspondingly smaller dimensions, such that the costs for the axle drive according to example aspects of the invention can be reduced overall.

Figure 2:
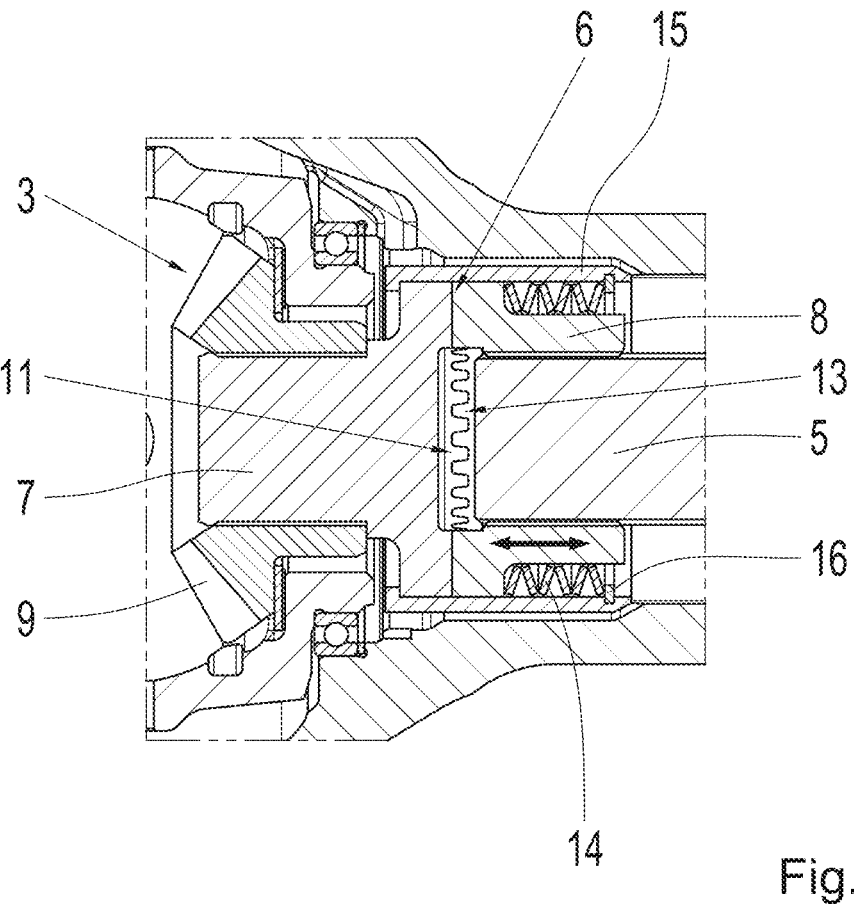
FIG. 2 shows a sectional detailed view of the overload decoupling device of the axle drive.

FIG. 2 shows a detailed view of the axle drive in the region of the output differential 3, which is in the form of a bevel gear differential, and in the region of the overload decoupling device 6 as well as in the region of an associated output shaft 5, which corresponds to the placement position of the overload decoupling device 6 on the right in the plane of the drawing in FIG. 1, wherein the configuration is identical in the placement position of the overload decoupling device 6 on the left in the plane of the drawing in FIG. 1.

The overload decoupling device 6 includes a first coupling element 7 and a second coupling element 8, between which an interlocking torque transmission, which can be decoupled according to the load, is provided. The first coupling element 7 is connected to a side gear as an output gear 9 of the output differential 3 for conjoint rotation. The second coupling element 8 is axially movably connected to the output shaft 5 for conjoint rotation.

Figure 3:
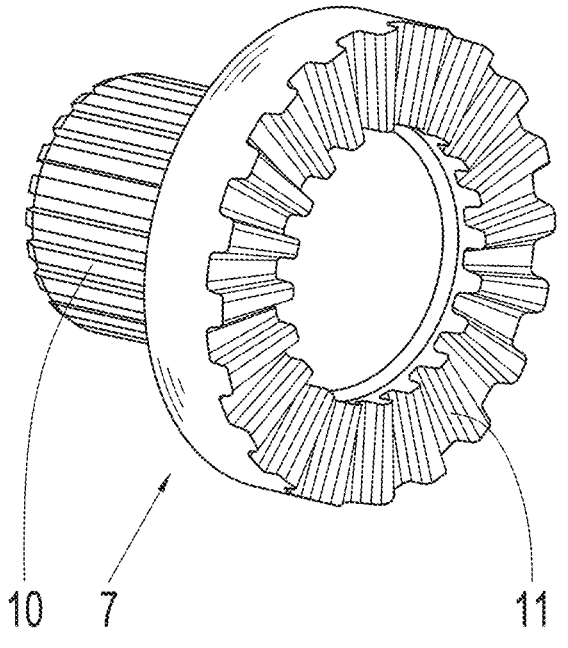
FIG. 3 shows a single-part view of a first coupling element of the overload decoupling device.

In particular, FIG. 3 clearly shows that the first coupling element 7 has a cylindrical shape with an external toothing 10, which external toothing 10 is in engagement with an internal toothing of the side gear 9 of the bevel gear output differential 3, and an end-face-dog-profiled toothing 11 having a repellent tooth geometry is integrally formed onto the cylindrical shape of the first coupling element 7 on the axial side thereof.

In particular, FIG. 4 clearly shows that the second coupling element 8 has a sleeve-shaped main body with an internal toothing 12 for the corotational connection to an external toothing on the output shaft 5, which is in the form of a half-shaft, and an end-face-dog-profiled toothing 13, which also has a repellent tooth geometry, is integrally formed on the main body on the axial side thereof. The second coupling element 8 is axially movable along the internal toothing 12, when an overload, or torque peaks, occur(s), against a spring element 14 for decoupling the corresponding end-face-dog-profiled toothings 11, 13 of the coupling elements 7, 8.

In the overload decoupling device 6 shown, the axial movement of the second coupling element 8, which is in the form of a sliding sleeve, allows the two coupling elements 7, 8 to move axially relative to each other. A sleeve 15 having the spring element 14 and a securing ring 16 preloads the two coupling elements 7, 8 to such an extent that a predetermined nominal torque can just still be transmitted.

Therefore, the two coupling elements 7, 8 of the overload decoupling device 6 can transmit torque up to a defined limit by the applied preload. When this limit is exceeded, for example, due to load peaks occurring on the input side or on the output side, the two coupling elements 7, 8 are decoupled from each other due to the axial movement of the second coupling element 8, in that the two end-face-dog-profiled toothings 11, 13 are no longer engaged, as is shown, for example, in FIG. 5. Therefore, the axle drive can still be operated quite normally without components undergoing unnecessary damage due to the case of overload.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS 1 electric machine
2 transmission
3 output differential or bevel gear output differential
4 output shaft
output shaft
6 overload decoupling device or overload coupling
7 first coupling element

8 second coupling element
9 side gear or output gear
external toothing of the first coupling element
11 end-face-dog-profiled toothings of the first coupling element
12 internal toothing of the second coupling element
13 end-face-dog-profiled toothings of the second coupling element
14 spring element or spring set
sleeve
16 securing ring

The invention claimed is:

1. An axle drive for a vehicle, comprising:
an electric machine (1) as a drive;
a transmission (2) coupled via an output differential (3) to output shafts (4, 5) for driving vehicle wheels; and
an overload decoupling device (6) arranged between the output differential (3) and the output shafts (4, 5) with respect to a torque flow,
wherein the overload decoupling device (6) decouples the torque flow between the output differential (3) and the output shafts (4, 5) when an overload occurs.

2. The axle drive of claim 1, wherein the overload decoupling device (6) comprises:
a first coupling element (7);
a second coupling element (8); and
an interlocking or friction-locking torque transmission disposed between the first and second coupling elements (7, 8), the interlocking or friction-locking torque transmission decouplable according to load.

3. The axle drive of claim 2, wherein the first and second coupling elements (7, 8) are inter-lockingly interconnected via toothings that include repellent tooth geometries and that are pre-loaded against each other.

4. The axle drive of claim 2, wherein the first and second coupling elements (7, 8) have friction surfaces, the first and second coupling elements (7, 8) being frictionally interconnected when the friction surfaces are preloaded against each other.

5. The axle drive of claim 2, wherein the first coupling element (7) is connected to the output differential (3), and the second coupling element (8) is connected to one of the output shafts (4, 5).

6. The axle drive of claim 5, wherein the first coupling element (7) is connected to an output side gear (9) of the output differential (3) for conjoint rotation, and the second coupling element (8) is axially movably connected to the one of the output shafts (4, 5) for conjoint rotation.

7. The axle drive of claim 6, wherein the first coupling element (7) has a cylindrical shape with an external toothing (10) engaged with an internal toothing of the output side gear (9) of the output differential (3), and an end-face-dog-profiled toothing (11) having a repellent tooth geometry is integrally formed onto the cylindrical shape on an axial side of the cylindrical shape.

8. The axle drive of claim 5, wherein the second coupling element (8) has a sleeve-shaped main body with an internal toothing (12) for corotational connection to an external toothing on the one of the output shafts (4, 5), and an end-face-dog-profiled toothing (13) having a repellent tooth geometry is integrally formed on the sleeve-shaped main body on an axial side of the sleeve-shaped main body.

9. The axle drive of claim 8, wherein the overload decoupling device (6) further comprises a spring element (14), and
wherein, when an overload occurs, the second coupling element (8) is axially movable along the internal toothing (12) against the spring element (14) for decoupling corresponding end-face-dog-profiled toothings (11, 13) of the first and second coupling elements (7, 8).

10. The axle drive of claim 2, wherein the overload decoupling device (6) further comprises a sleeve (15), the first and second coupling elements (7, 8) being received within the sleeve (15), the second coupling element (8) being slidable within the sleeve (15).

11. The axle drive of claim 10, wherein the overload decoupling device (6) further comprises a spring element (14) radially between the sleeve (15) and the second coupling element (8), and
wherein, when an overload occurs, the second coupling element (8) is axially movable against the spring element (14) for decoupling the first and second coupling elements (7, 8).

12. The axle drive of claim 1, wherein the output differential (3) comprises a bevel gear differential.

13. The axle drive of claim 1, wherein one or both of the electric machine (1) and the transmission (2) is arranged coaxially with the output shafts (4, 5).

14. The axle drive of claim 13, wherein the electric machine (1) is arranged axially next to the transmission (2) such that at least one of the output shafts (4, 5) is guided axially through the electric machine (1) and the transmission (2).

15. An axle drive for a vehicle, comprising:
an electric machine (1) as a drive;
a transmission (2) coupled via an output differential (3) to output shafts (4, 5) for driving vehicle wheels; and
an overload decoupling device (6) arranged between the output differential (3) and the output shafts (4, 5) with respect to a torque flow, the overload decoupling device (6) comprising:
a first coupling element (7);
a second coupling element (8);
a sleeve (15), the first and second coupling elements (7, 8) being received within the sleeve (15), the second coupling element (8) being slidable within the sleeve (15); and
an interlocking or friction-locking torque transmission disposed between the first and second coupling elements (7, 8), the interlocking or friction-locking torque transmission decouplable according to load.

* * * * *